Oct. 8, 1940.  J. R. HANNOLD  2,216,911
ANIMAL TRAP
Filed July 6, 1938

INVENTOR
John R. Hannold
BY
Louis Prevost Whitaker
ATTORNEY

Patented Oct. 8, 1940

2,216,911

UNITED STATES PATENT OFFICE 2,216,911

ANIMAL TRAP

John R. Hannold, Lititz, Pa., assignor to Animal Trap Company of America, Lititz, Pa., a corporation of Pennsylvania Application July 6, 1938, Serial No. 217,661

8 Claims. (Cl. 43—92)

My invention consists in the novel features hereinafter described, reference being had to the accompanying drawing which illustrates one form in which I have contemplated embodying the invention, and a slight modification thereof, and said invention is fully disclosed in the following description and claims.

In the setting of traps having spring actuated opposed jaws, the setting means including a pan usually located about centrally within the jaws, the trap usually is set by the hand of the trapper, as it is seldom that the ground is of sufficient hardness to permit using the foot to compress the heavy spring. When the spring is compressed and the jaws opened, they have to be held by one hand only while the operator uses the other hand to lift the pan into its proper setting position, so that the jaws will be held locked. This is not only inconvenient, but if the operator loses control of the spring and jaws, there is danger of injury to the hands.

The object of my invention is to facilitate the setting of these traps, by providing the pan with a finger engaging setting arm projecting below the trap body or frame in a position where it can be engaged by the finger without placing the finger between the jaws of the trap, or releasing the grip of either hand upon the jaws. It also frequently happens in setting these traps that the operator will open the jaws and compress the springs before realizing that the pan has been moved outwardly to a position where it will obstruct one of the jaws, and the operator will consequently have to release the spring and jaws and begin over again. This constitutes a somewhat precarious operation.

In one form of my invention a stop is provided to engage this setting arm so as to prevent the pan from being raised to or beyond vertical position. This insures that the pan will always be inside the jaws in a substantially horizontal position, so that the trap can be set in the usual way and the setting completed by the use of the finger engaging arm.

In case the trap is provided with a spring actuated pivoted leg guard, such as is shown, described and claimed in Letters Patent of the United States granted to John U. Lehn, No. 1,912,457, dated June 6, 1933, this leg guard folds down over the jaws in closed position in setting the leg guard, and is held in the set position by one of the jaws, and its locking means. In order to set this type of trap it is necessary to throw the pan outwardly slightly beyond a vertical position, in order to first set the guard, and thereafter the pan is returned to its normal substantially horizontal position within the jaws. In applying my invention to this type of trap, the finger engaging arm is so located that when the pan is raised to, or slightly beyond, the vertical position, the finger engaging arm will lie in the path of the guard when the latter is swung down into its set position, thereby automatically restoring the pan to its substantially horizontal position, after which the spring of the jaw is compressed, the jaws opened into set position, and secured by slightly raising the pan into locking position, by the aid of the finger piece.

Referring to the accompanying drawing.

Figure 1:
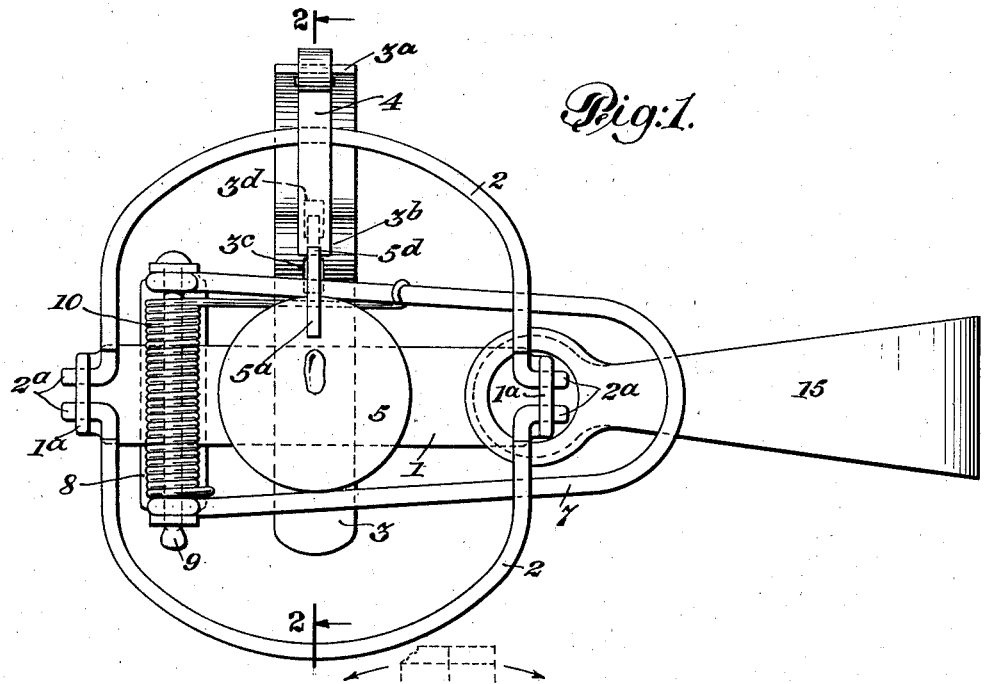
Fig. 1 is a plan view of a trap provided with a leg guard and having my present invention embodied therein, the trap being shown in set position.
Figure 2:
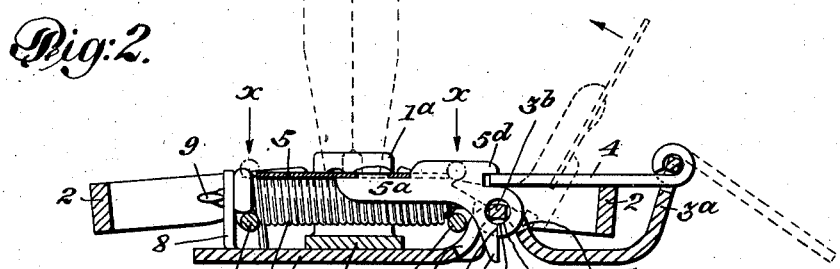
Fig. 2 represents a section on the line 2—2 of Fig. 1, dotted lines showing the position of the jaws when closed, and the position of the pan when in raised position, to permit the setting of the leg guard.
Figures 3, 5:
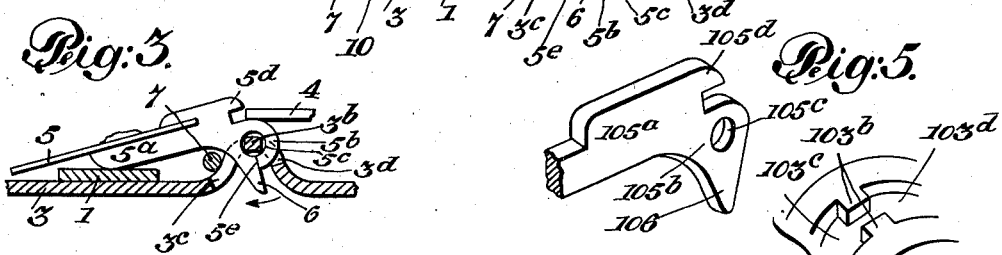
Fig. 3 is a detail view, partly in section, showing the pan, and a portion of the locking dog, before the pan is raised to set position.
Fig. 5 is a detail view of a portion of the pan shank showing a slightly modified form of the finger engaging setting arm.

Referring to Figs. 1, 2 and 3 of the drawing, I represents the base plate having its ends turned up, as indicated at 1a, and provided with apertures to receive the pivotal portion 2a of the jaws 2, 2. The trap here shown is of the so-called "long spring" type, and the spring, indicated at 15, has its ends provided with eyes to surround one of the upturned portions 1a of the base plate 1, so as to act upon the jaws in the usual manner to close them. In this instance the setting means comprises the usual dog and pivoted pan. 3 represents what is usually termed the cross, or cross bar, secured to the base 1 by welding or by riveting, and extending transversely thereof, forming therewith the main frame of the trap. The cross is provided with the usual bent up portion carrying the pivotal support 3b, upon which the pan is mounted. In these figures this pivotal support is integral with the cross and is formed by cutting slots 3c and 3d on opposite sides thereof. The outer end of the cross at the side adjacent to this pivotal part, is bent up and slotted to form a pivotal part 3a at its upper end upon which the dog 4 is pivotally mounted in the usual manner, and in position to engage one of the jaws and lock it in set position. The pan, indicated at 5, is shown provided with a shank 5a, having a portion 5b provided with an aperture 5c to engage the pivotal support 3b.

The pan shank is shown as provided with a downwardly extending finger engaging arm 6 projecting below the pivotal support 3b. This arm, as will be seen, occupies part of the space within the upwardly curved portions of the cross, and in the trap of the type shown in Figs. 1, 2 and 3, the slot 3c at the inner side of the pivotal part 3b, is of sufficient length to permit the pan to be swung upwardly and slightly beyond a vertical position, as indicated in dotted lines in Fig. 2, to permit the setting of the leg guard, hereinafter described.

As shown in these figures, the trap is provided with a leg guard, indicated at 7, of the kind set forth in the Lehn patent hereinbefore referred to. This guard is usually formed of rods of the desired diameter, bent into U form, the lateral arms being spaced apart a distance slightly greater than the width of the leg of the animal to be trapped, but not sufficient to permit the passage of the body of the animal between said arms. These arms are suitably provided with eyes at their extremities to engage a pivot, indicated at 9, extending through upturned end portions of a cross bar 8, secured in any desired manner, as by welding or riveting, to the base plate, and this guard is provided with a spring 10 adapted to move it in a direction away from the jaws 2, 2, as clearly indicated in Fig. 1 and Fig. 2, the guard must be swung down into set position, while the jaws are closed, and when the spring 15 is compressed and the jaws are opened into set position, the jaw which is held by the dog in set position will likewise hold the guard in its set position, as clearly indicated in Fig. 1.

When the pan is raised to and slightly beyond the vertical position, as shown in dotted lines in Fig. 2, it allows the heel of the pan which carries the detent 5d for engaging the dog 4, to rest upon a portion of the cross and support the pan in that position, so that the leg guard may be swung down into its set position, indicated in full lines in Fig. 2. The finger engaging setting arm is so located that when the pan is in this position the setting arm will be directly in the path of one arm of the guard as it is moved down in the direction of the arrow x in Fig. 2, so that as the guard is swung downward into set position, it will strike the setting arm 6 and passing on will tilt the pan over past the vertical and permit it to drop into the normal, substantially horizontal position, which is indicated in Fig. 3, thus relieving the operator of the necessity of tilting the pan over into the substantially horizontal position, after the guard is moved to set position and while he is compressing the spring 15.

In setting the trap it is usually placed over the knee, the pan being moved to the position indicated in dotted lines in Fig. 2. The leg guard is swung over the jaws while the latter are in closed position, and pressed downwardly on top of the spring 15, where it can be held by the operator. As the guard moves down into set position, it strikes the finger engaging setting arm 6, as before described, and throws the pan back to its normal position indicated in Fig. 3. The spring 15 is then compressed by downward pressure with the right hand, which also engages the guard and moves it further downward. This releases the tension of the spring 15 on the jaws 2, 2, which are then opened with the left hand and held open by the heel of the palm and the thumb, the fingers being under the base. In this position the jaws will hold the spring compressed and the leg guard in set position, and the right hand can be moved over to place the dog over one jaw. A finger of the right hand can then be used to engage the setting arm 6 and raise the pan by pressing on the finger engaging arm in a direction toward the base of the trap, as the dog is held by the right thumb over one jaw and on the portion of the pan shank just above the pivotal connection. The raising of the pan by means of the setting arm will bring the detent 5d over the dog and the trap is then in set position, as clearly shown in full lines in Fig. 2.

By the use of my invention, the left hand can be kept on the jaws to prevent any danger of their closing during the setting operation, and the operator does not have to remove it to lift the pan into operative relation with the dog, leaving all the pressure to be held by the right thumb, as would be the case otherwise.

While I have illustrated my invention in connection with a long spring trap, it will be understood that my invention is equally applicable to traps of other type, such as the jump traps, for example.

In forming the pan shank, as best indicated in Figs. 2 and 3, I prefer to form a cut, indicated at 5e in the portion surrounding the aperture 5c, which is conveniently made in line with one edge of the finger engaging setting arm. This permits the thinner part of the shank surrounding this aperture to be left open to permit the shank and pan to be assembled with the pivot 3b, after which the aperture can be closed with a pair of pliers or otherwise.

Figure 6:
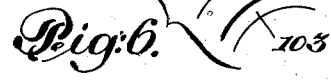
Fig. 6 represents a portion of the cross showing the pivotal mounting for the pan, and formed as illustrated in Fig. 5.

In some instances, however, the cut referred to is omitted, as indicated in Fig. 5, for example, in which the parts corresponding with those shown in Figs. 1, 2 and 3, are given the same reference characters with the addition of 100. In this instance the finger engaging setting arm 106 is formed integrally with the shank and without the cut previously referred to, the pivotal aperture 105c being stamped or punched out of the solid metal. In this case the pivot proper, which is indicated in Fig. 6, is formed in two parts on the opposite sides of the slot 103c and 103d shown in that figure, and the two parts of the pivot are left separated until the pan shank is inserted in proper relation thereto, after which the sides of the cross carrying these pivot parts are pressed toward each other in any suitable manner, forcing the pivot parts 103b, 103b, into the opposite sides of the pivotal aperture 105c in the pan shank. The operation will, however, be the same as previously described.

Where the trap is made without the leg guard it is unnecessary that the pan should be tilted over to or past a vertical position at any time. In fact, if the pan does so tilt beyond the vertical, it will interfere with the setting of the trap as it cannot be swung back to its inner position while the jaws are open.

Figure 4:
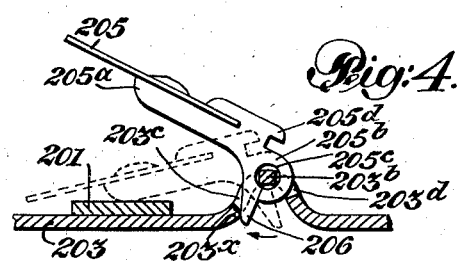
Fig. 4 is a view similar to Fig. 3, showing a slight modification intended for use with traps not provided with the leg guard and having a stop for limiting the upward swing of the pan.

In Fig. 4, in which the parts corresponding with those shown in Figs. 1, 2 and 3, are indicated by the same reference characters with the addition of 200, it will be noted that the slot 203c on the inner side of the pivot 205c is made slightly shorter so as to provide the stop 203x at the inner end of the slot 203c to engage the setting arm 206, to prevent the pan from being raised higher than the position shown in Fig. 4, thus preventing it from being tilted over to the position on the opposite side of the vertical at any time. It follows, therefore, that in setting the trap the operator can compress the spring and open the jaws, as before described, with the knowledge that there is no possibility of the pan being out of its correct normal position, and therefore, there will be nothing to interfere with the proper setting of the trap. After the spring is compressed, in the manner previously described, the operator need only open the jaws and with his right hand place the dog in operative position and then engage the arm 206 with his finger, so as to raise the pan into operative relation with the dog, as previously described with reference to Figs. 1, 2 and 3.

It will thus be seen that the improved finger engaging setting arm in any form of trap facilitates placing the pan in operative relation with the dog, and in the form of trap shown in Figs. 1, 2 and 3, in which the leg guard is employed, and in which it is necessary to throw the pan to its outermost position the pan will be automatically restored to its normal position by the setting of the guard, thus performing a double function, and in the form of trap not provided with the leg guard, thus having a stop to arrest the setting arm, as previously described, the pan is positively prevented from being swung outwardly beyond the pivotal connection, where it would interfere with the setting of the trap, again performing a double function.

While I find it most convenient in the latter case to shorten the slot 203c to provide the stop 203x, as shown in Fig. 4, it is obvious that the stop for the setting arm to perform this function may be formed in other ways.

What I claim and desire to secure by Letters Patent is:

1. A trap provided with a main frame, a pair of jaws pivotally connected thereto, and an actuating spring for said jaws, said main frame having an upwardly curved portion provided with a pan supporting pivot located above the plane of the main frame, setting means for the jaws including a pan mounted on said pivot and provided with a setting arm extending downwardly from said pivot and capable of movement within the curved portion, to raise the pan into setting position and held out of contact with the ground by said pivot.

2. A trap provided with a pair of pivoted jaws, a pivoted dog for engaging one of said jaws, and locking it in set position and a pivoted pan having a manually operable setting arm located out of the path of the jaws for effecting the locking of said dog in the set position of the trap.

3. A trap provided with a main frame, a pair of spring actuated jaws pivotally connected thereto, a locking dog, a pan pivotally connected with the frame and having a portion to engage said dog, a finger engaging setting arm secured to said pan for moving the pan into engagement with the dog in setting the trap, a spring actuated guard pivoted to the frame in position to pass over the jaws when in closed position, and to be held by one of said jaws in the set position of the trap, said finger engaging setting arm, when the pan is raised to permit the passage of said guard, lying in the path of said guard, to restore the pan to its normal unset position.

4. A trap provided with pivoted spring actuated jaws, a spring actuated leg guard pivoted transversely to the pivotal axes of said jaws and adapted to fold over the jaws when the latter are closed to set said guard, setting means for the jaws, including a horizontally disposed pivoted pan capable of being moved to and supported in a substantially vertically disposed position, to permit the movement of said guard to set position, and a finger engaging setting arm secured to said pan, for raising it from its horizontally disposed position to lock said jaws and said guard in set position, said setting arm lying in the path of said guard when the pan is in its vertically disposed position, to automatically restore the pan to its horizontally disposed position.

5. A trap provided with a main frame, a pair of spring actuated jaws, locking means for said jaws, including a pan pivotally supported with respect to said frame, and a manually operable setting arm, connected with said pan, and extending downwardly therefrom out of the path of the jaws.

6. A trap provided with a main frame, a pair of spring actuated jaws, a pivoted dog for engaging one of said jaws, a pivoted pan for engaging said dog to hold the trap in set position, and a manually operable setting arm connected with said pan, and extending downwardly therefrom out of the path of the jaws to effect operative engagement of the pan with the dog, in setting the trap.

7. A trap provided with a frame, a pair of pivoted spring actuated jaws, locking means for holding said jaws, including a pivoted pan, all parts of which are out of the range of movement of said jaws in the normal set and released positions of the pan, a manually operable arm connected with said pan, and extending downwardly and substantially vertically below the same, and normally held in position to be engaged by the finger and moved laterally to effect the setting of the trap.

8. A trap provided with a frame, a pair of pivoted spring actuated jaws, locking means for holding said jaws, including a pivoted pan, all parts of which are out of the range of movement of said jaws in the normal set and released position of the pan, a manually operable arm connected with said pan, and extending downwardly and substantially vertically below the same, and normally held in position to be engaged by the finger and moved laterally to effect the setting of the trap, and a stop for preventing the raising of the pan beyond a vertical position.

JOHN R. HANNOLD.